United States Patent
Baker

(10) Patent No.: US 9,445,154 B2
(45) Date of Patent: Sep. 13, 2016

(54) METHOD FOR DEMONSTRATING INTERACTION WITH A TOUCH SENSITIVE SCREEN VIA VIDEO

(71) Applicant: Glance Networks, Inc., Arlington, MA (US)

(72) Inventor: Richard L. Baker, Belmont, MA (US)

(73) Assignee: GLANCE NETWORKS, INC., Arlington, MA (US)

( * ) Notice: Subject to any disclaimer, the term of this patent is extended or adjusted under 35 U.S.C. 154(b) by 0 days.

(21) Appl. No.: 14/326,234

(22) Filed: Jul. 8, 2014

(65) Prior Publication Data

US 2015/0009184 A1   Jan. 8, 2015

Related U.S. Application Data

(60) Provisional application No. 61/843,880, filed on Jul. 8, 2013.

(51) Int. Cl.
| | | |
|---|---|---|
| *G06F 3/042* | (2006.01) | |
| *H04N 21/462* | (2011.01) | |
| *H04N 5/262* | (2006.01) | |
| *H04N 21/4223* | (2011.01) | |
| *H04N 21/431* | (2011.01) | |
| *H04N 21/437* | (2011.01) | |
| *H04N 21/44* | (2011.01) | |
| *H04N 5/232* | (2006.01) | |

(52) U.S. Cl.
CPC ...... *H04N 21/4622* (2013.01); *H04N 5/23216* (2013.01); *H04N 5/2621* (2013.01); *H04N 21/4223* (2013.01); *H04N 21/437* (2013.01); *H04N 21/4318* (2013.01); *H04N 21/44* (2013.01)

(58) Field of Classification Search
CPC .. G06F 3/04883; G06F 3/042; G06T 19/006
See application file for complete search history.

(56) References Cited

U.S. PATENT DOCUMENTS

| | | | |
|---|---|---|---|
| 5,612,734 A * | 3/1997 | Nelson et al. ............ 348/14.16 |
| 2008/0184124 A1* | 7/2008 | Agarwal .................. H04N 7/15 715/733 |
| 2008/0298649 A1* | 12/2008 | Ennis et al. .................. 382/125 |
| 2011/0225494 A1* | 9/2011 | Shmuylovich ...... G06F 3/04883 715/705 |
| 2012/0081611 A1 | 4/2012 | Tan et al. |
| 2013/0215292 A1* | 8/2013 | Reichelt ........................ 348/239 |
| 2013/0258269 A1* | 10/2013 | Shalon ........................... 351/79 |
| 2013/0322785 A1* | 12/2013 | Kamamori ............ G06F 3/0484 382/311 |

* cited by examiner

*Primary Examiner* — Christopher E Leiby
(74) *Attorney, Agent, or Firm* — Anderson Gorecki LLP

(57) ABSTRACT

First video showing content displayed on a touch sensitive screen is combined with second video from a camera showing a user's interaction with the touch sensitive screen. The second video is filtered (digitally or physically) to prevent the camera from capturing the content of the touch sensitive screen. Combining the first video with the second video creates a combined video containing both a high quality image of the graphic user interface of an application appearing on the touch sensitive screen as well as how a person operating the application is gesturing and otherwise touching the touch sensitive screen when interacting with the application.

18 Claims, 5 Drawing Sheets

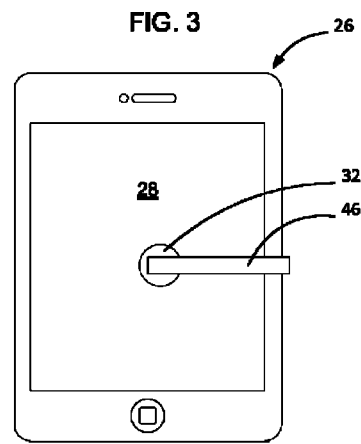
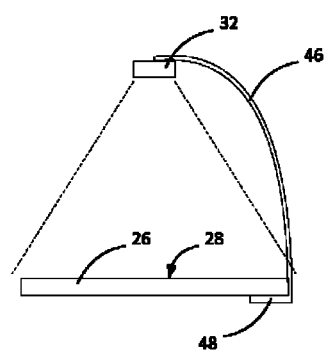
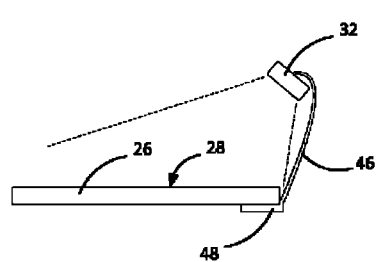

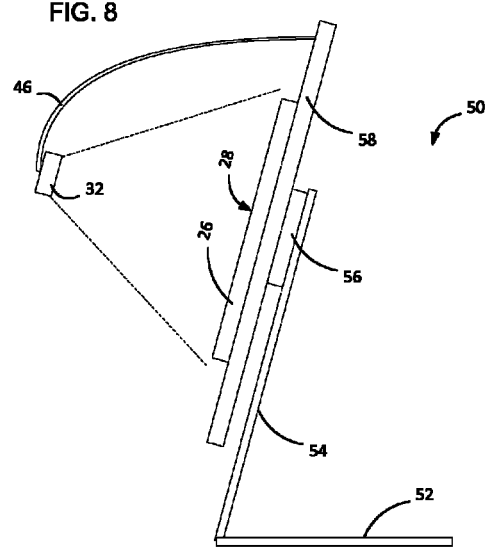
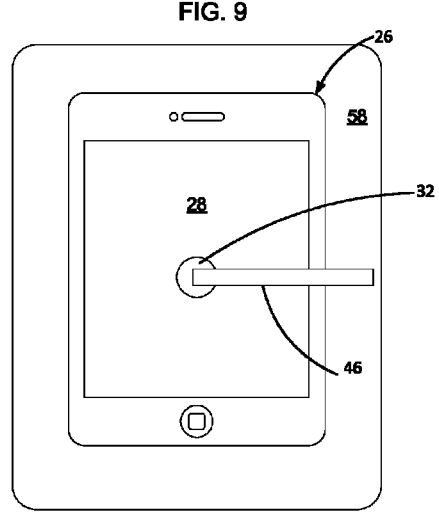

METHOD FOR DEMONSTRATING INTERACTION WITH A TOUCH SENSITIVE SCREEN VIA VIDEO

CROSS REFERENCE TO RELATED APPLICATIONS

This application claims priority to U.S. Provisional Application 61/843,880, filed Jul. 8, 2013, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND

This disclosure relates to a method of demonstrating interaction with a touch sensitive screen via video.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below. All examples and features mentioned below can be combined in any technically possible way.

A composite video stream is created by combining a first video stream containing content being shown on a display of a device with a touch sensitive screen, with a second video stream containing an external camera view encompassing the touch sensitive screen of the mobile device. The second video stream is filtered (digitally or physically) to remove the content being shown on the display and optionally other portions of the image other than a user's hand as the user interacts with the touch sensitive screen. Combining the first video stream with the second video stream creates a combined video stream in which the first video stream is used to show the content of the display of the mobile device and the second video stream is used to show interaction by a user with the content on the display of the device. This enables a person receiving the combined video to see both a high quality image of the graphic user interface of an application running on the device as well as how a person operating the application is gesturing and otherwise touching the touch sensitive screen when interacting with the device.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 3-5 show a first embodiment in which a camera is connected to and positioned above a device with a touch sensitive screen;

FIGS. 8-9 show an embodiment in which a camera is connected to a stand supporting a device with a touch sensitive screen;

DETAILED DESCRIPTION

Figure 1:
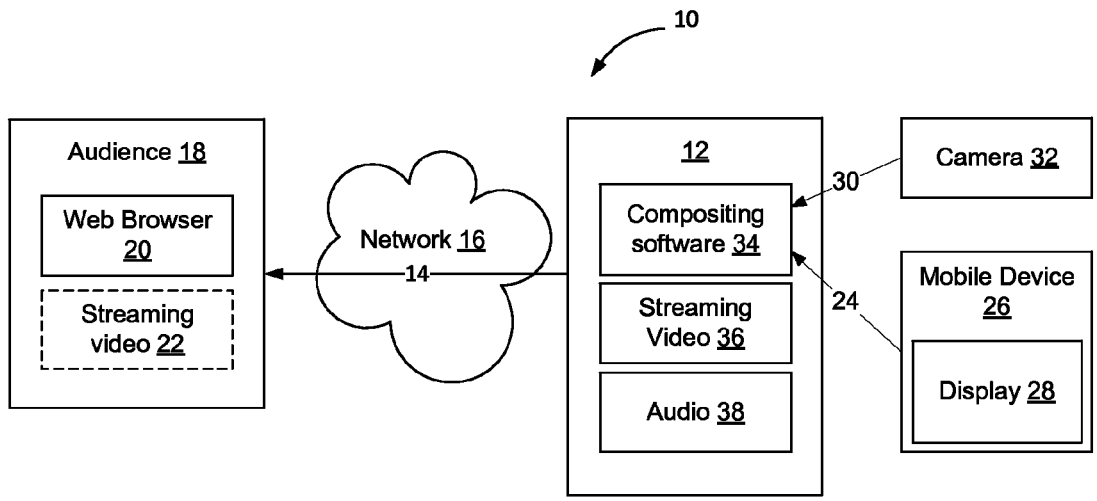
FIG. 1 is a functional block diagram of an example system for providing a composited video stream.

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

As devices with touch sensitive screens such as mobile devices have become ubiquitous, applications that are designed to run on such devices have proliferated. There are many instances where it would be advantageous to enable interaction with an application on a device having a touch sensitive screen to be shown over a video stream. For example, a sales representative for a company that sells a software application for a mobile device may wish to demonstrate the application to a remote customer. As another example, a customer support agent for a company that sells a mobile device such as a tablet or smartphone may want to educate a new (remote) user about how to use the device. As yet another example, a trainer for a software company may wish to show new customers how to use an application running on the mobile device. Likewise, a company presenting at a trade show may want to demonstrate operation of an application running on a mobile device to an assembled audience, or may want to demonstrate operation of a new device such as a wearable device to an assembled audience. Other examples exist as well where it would be useful to be able to demonstrate interaction between a user and a device with a touch sensitive screen or interaction between a user and an application running on a device with a touch sensitive screen.

Unfortunately, demonstrating this type of interaction is not trivial, particularly where the person who is to view the demonstration is located remotely. For example, on a device with a touch sensitive screen, demonstration of the application may require that the remote viewer be shown where and how to touch the screen to interact with the application's graphical user interface. Although it is possible to capture and transmit a video stream of the device's screen so that the device's screen is visible remotely, this does not enable the audience to see how the person demonstrating the application is actually touching the device or otherwise interacting with the device to cause the application to behave as shown in the video stream.

One way to show interaction between a person and an application running on a device with a touch sensitive screen is to use a camera to record (or stream live video) of the user as the user interacts with the application. For example, the mobile device (e.g. tablet computer, smartphone, or other device with a touch-sensitive screen) may be placed under a document camera or other camera such as a web camera. In this manner, the external camera is able to show both the application on the screen of the mobile device as well as the user's hand as the user interacts with the application displayed on the screen. Unfortunately, where the external camera is used to capture the information shown on the display, this was found to result in a video stream in which the mobile device's screen is less pristine, because the screen often has much higher resolution than the external camera. Additionally, light scattering off the device's screen degrades the visual quality of the image shown on the device and exposure is either optimized for the screen or for the user's hand, but rarely both. Further, the external camera's view of the screen may often be blocked by the person's hand. For example, when the person moves their hand over the display to touch a particular portion of the screen, at least a portion of the screen typically will be obstructed by the person's finger, potentially causing confusion about what the person just did.

According to an embodiment, a method is provided that is well suited to delivering live remote demonstration of interaction between a user and a device having a touch sensitive screen. The goal is to give the audience a pristine, high resolution, glare-free, color-accurate view of the touch or mobile device's screen, while unambiguously illustrating the touch gestures used to interact with the device's screen and buttons.

In one embodiment, the method composites an image of the device and two live video streams into a single view that is shown to the audience. One input video stream is the device screen's high resolution video. If the device is an Apple iPhone or iPad, HD video of the device's live screen is present on the device's docking port. Alternatively, the device can be configured to "AirPlay" the live video of its screen (via third party software) to the compositing computer, where it appears as a Quicktime video source. Most Android powered phones and tablets and the Kindle Fire have a mini-HDMI port that presents the device's screen HD video. Common third party devices can connect this HD video source to the compositing computer.

The second video stream comes from an external camera (e.g., a wireless or wired USB webcam) positioned to view and capture the user's interaction with the touch sensitive screen. The camera may be, for example, rigidly mounted directly above (or possibly to the side) of the mobile device, about 6 to 12 inches from the device's screen. The external camera is positioned so its field of view includes the entire device, and possibly some of the area surrounding it. In that manner the external camera can see gestures the user makes with his fingers on the device's screen, as well as interactions with device's physical buttons, such as an iPad's Home button just beyond the bottom of its screen or the volume and power buttons along the device's edge.

As noted above, when an external camera is used to capture the content of the device's screen, the camera's CCD may spatially alias textures on the screen, may alter its colors, may use a less-than-optimum exposure or focus for either the screen or the hand, may slip in and out of focus, may add camera noise, and/or may capture the screen video at too low of a resolution. In this method, by contrast:

The device's video can be seen in high resolution, because the device's screen content is captured natively (rather than by the external camera) and scaled to nearly fill the entire transmitted field of view.

Screen objects and textures are not spatially aliased by the external camera's CCD array of pixels (creating distracting Moire patterns).

The device's video stays in perfect focus, is glare-free, is color-temperature accurate, and is unsullied by camera noise.

The physical device itself is seen in full resolution and glare-free (because it is actually a high-quality photograph).

The audience sees a spatially accurate view, with no keystone effect.

The audience sees every gesture (including complex multitouch gestures) used to interact with the software.

The audience can also see how gestures interact with the device's physical buttons, because making the user's hand translucent leaves their view unobstructed.

Where physical filtering is used to minimize the external camera's ability to detect the display, the physical filtering also prevents the external camera's auto-iris from being confused by the screen's bright display. Since the external camera cannot see the screen, it can optimize its exposure for the best view of the user's hand gestures.

The external camera can be a modest resolution device with an inexpensive lens, since the high resolution screen is captured directly from the mobile device.

The view auto-rotates when the device is rotated, in a natural and intuitive manner.

Once the video streams are combined, only one video stream needs to be sent to the audience. This combination may occur anywhere, but preferably is performed relatively close to the source. And since the device's screen nearly fills the entire view, a maximal number of pixels in the transmitted video are used to reproduce the screen's contents.

The video stream showing the user's hand can be visually muted when appropriate, so the audience only sees a pristine view of the device's screen and case when the user is not interacting with the device.

FIG. 1 is a functional block diagram of an example system for providing a composited video stream. As shown in FIG. 1, the system 10 includes a compositing computer 12 which creates a video stream 14 which is transmitted via network 16 to an audience computer 18. The video stream 14 may be displayed using a web browser 20 or other software 22 designed, e.g., to display streaming video.

According to an embodiment, compositing computer 12 receives a first video stream 24 from a mobile device 26 showing content being displayed on a touch sensitive screen 28 of the mobile device. The compositing computer 12 also receives a second video stream 30 from an external camera 32 showing user interaction with the mobile device 26. Compositing software 34 on the compositing computer 12 combines the first video stream 24 with the second video stream 30 to create output video stream 14. Additional details associated with creation of the output video stream 14 are provided below. The output video stream 14 may be transmitted directly after being created or may be stored and provided at a later point in time. Optionally, the compositing computer 12 includes one or more auxiliary software programs, such as streaming video software 36 and audio software 38. Streaming video software, in this implementation, supports transmission of output video stream 14 over network 16. Audio software facilitates acquisition of audio to be provided in connection with output video stream 14.

Figure 2:
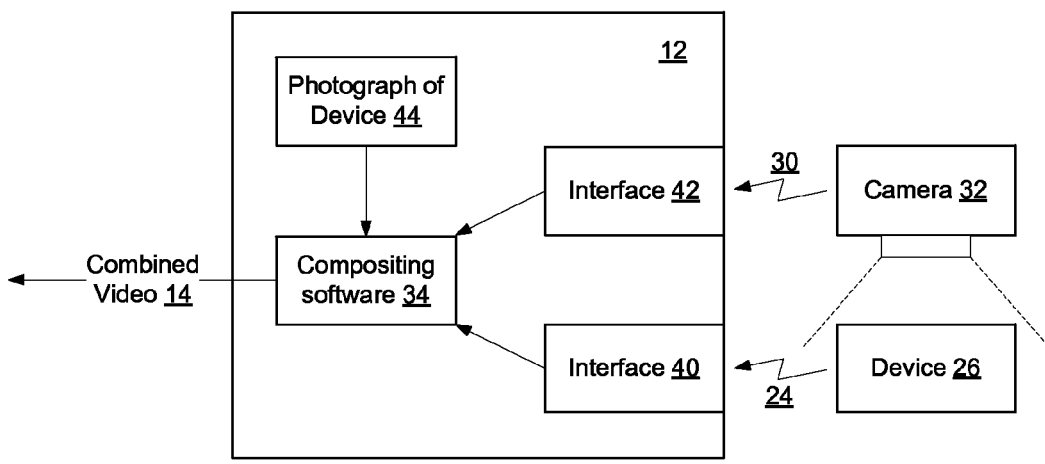
FIG. 2 is a functional block diagram of a video compositing system according to an embodiment.

FIG. 2 shows an implementation of compositing computer 12 in greater detail. As shown in FIG. 2, the compositing computer 12 includes a first interface 40 to receive input 24 from the mobile device 26. First interface 40 may be a wired interface, such as a USB port, or may be a wireless interface configured to communicate using one or more wireless networking protocols.

Compositing computer 12 further includes a second interface 42 to receive input 30 from the external camera 32. Second interface 42 may be a wired interface, such as a USB port, or may be a wireless interface configured to communicate using one or more wireless networking protocols.

Compositing software 34 receives video 24 from the display of the mobile device 26 and the video 30 from the camera 32. The compositing software combines the two video streams 24, 30, optionally with an image such as a photograph 44 of the type of mobile device being used, to create the combined video stream 14.

The external camera 32 may be attached to the device 26, may be provided in a fixed location to view the device in a particular area, or may be movable relative to the device such as by being worn by the user. In embodiments where the external camera is not fixed to the device, the compositing software includes detection functionality to determine the location of the device to enable the location of the user's hand to be determined relative to the display so that the user's hand may be shown in the composited video.

FIGS. 3-5 show an implementation in which the camera 32 is attached to the device 26. Providing the external camera in a fixed location relative to the device has the advantage of enabling the compositing software to know the approximate location of the device within the field of view. If desired, edge detection may still be used in connection with this embodiment to further refine the location of the device within the camera's field of view.

FIG. 3 shows a top view of an embodiment and FIG. 4 shows a side view. FIG. 5 shows an alternate side view in which the camera is positioned at a 45 degree angle relative to the display. As shown in FIG. 3, an external camera 32 is suspended by arm 46 over the screen (display) 28 of mobile device 26. The arm 46 may be affixed to the back of the mobile device 26 by connector 48 or may be free-standing and not connected to the mobile device. Connector 48 may use any form of connection device to enable the arm 46 to be retained relative to the mobile device. Example connection devices include mechanical fasteners, adhesive fasteners, and suction cup fasteners although this list is not intended to be exhaustive.

FIG. 4 shows an edge view of the embodiment of FIG. 3 in profile, and FIG. 5 shows an alternative in which the camera is designed to view the device screen at an angle (45 degrees in the illustrated embodiment). In the embodiment shown in FIGS. 3-5, the arm is formed as a U-shaped bracket that attaches to the back of the mobile device and extends to wrap over the top edge of the mobile device to a point 8 to 12 inches directly above the viewing side of the mobile device. This enables the camera to look directly down at the mobile device's screen to capture interaction of the user with the touch sensitive screen. By attaching the external camera to the mobile device itself, a person demonstrating the mobile device is not required to place the mobile device "under" a fixed external camera and thus can interact with the mobile device in a more natural manner as the user holds the mobile device.

Figure 6:
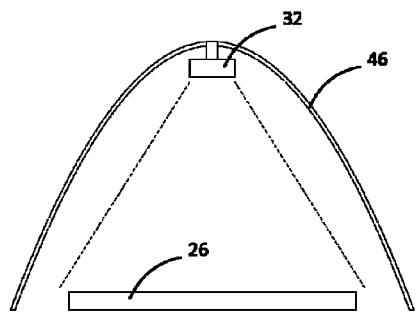
FIGS. 6-7 show a second embodiment in which a camera is positioned above a device with a touch sensitive screen but not connected to the device.
Figure 7:
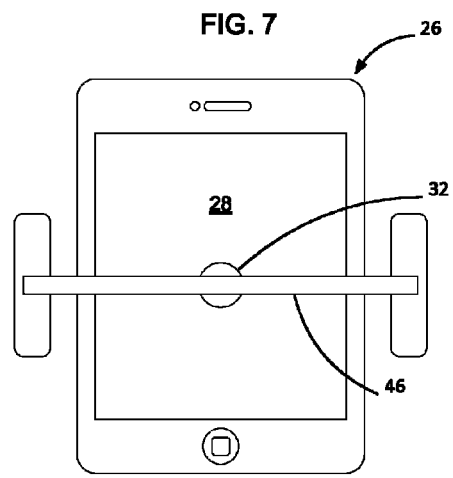

Although in one embodiment the camera is mounted on a stand affixed to the device to be viewed (as shown in FIGS. 3-5), in another embodiment the external camera is implemented using a stationary external camera. In this embodiment, the user places the device under the external camera and interacts with the device. In this embodiment the external camera does not need to be mounted to the device, by may instead be held by a separate stand. FIGS. 6 and 7 show an embodiment of this nature. The device may be placed under the camera and connected to the stand or may be positioned under the camera and not connected to the stand. An advantage of connecting the device to the stand is that rotation of the device may be desirable, and connecting the device to the stand supporting the camera facilitates maintenance of the positional relationship of the camera relative to the display.

In another embodiment, a stand is used to support both the device and the camera. FIGS. 8-9 shows an example stand of this nature. As shown in FIGS. 8-9, a stand 50 includes a base 52 and a riser 54. The riser supports a pivot 56 on which is mounted a support plate 58. The device 26 to be viewed is positioned on the support plate 58 to be viewed by a user. The device may be held on support plate 58 using any desired fastener, such as Velcro, mechanical clips, or other devices. Camera 32 is positioned above the surface of the device by arm 46. Since the arm/camera is connected to support plate 58, rotation of the support plate 58 to change the orientation of the device 26 will not change the positional relationship between the device 26 and camera 32. FIG. 9 shows a view of the device 26 as viewed by the user. As shown in FIG. 9 the camera extends above the display 28 of the device to be visualized so that the camera is able to capture the user's interaction with the device.

Although the embodiment shown in FIGS. 6-7 shows the camera on a stand, in another embodiment, the external camera is attached to something being worn by the person who is interacting with the mobile device. For example, the person interacting with the mobile device may wear a glasses mounted external camera or an external camera mounted on another personal article such as on their shirt.

In the embodiments shown in FIGS. 3-5 and 8-9, the location of the device is known relative to the camera. Accordingly, in this implementation the view of the camera may be correlated with the device 26 according to this fixed positional relationship. Where the device is not fixed relative to the camera, such as the embodiment shown in FIGS. 6-7, or where a personal mounted camera is used, the location of the device may be digitally determined from the camera image so that movement of the device within the field of view is able to be tolerated and compensated for with software. In this embodiment, the hand extraction software is somewhat more sophisticated, since the hand extraction software should be configured to determine the location of the device as well as discern the hand from other items in the field of view. It should be noted that position determination may be used even where the location of the device is fixed relative to the camera, if desired.

In an implementation, the color of the device is used to identify the device within the field of view to digitally discern the location of the device more easily within the camera image. Locating the device relative to the user's hand enables the compositing software to accurately align the external view of the device and the person's hand with the view of the display that is separately provided by the device.

In an implementation where the device is not fixed relative to the camera, for example in an embodiment using a worn camera such as a glasses mounted camera, edge detection software may be used to detect the location of the mobile device and the position of the user's hand relative to the display of the mobile device. Optionally, use of a particular color sleeve for the mobile device may make detection of the mobile device easier for the edge detection software. Since the external camera captures movement of the user's hand relative to the mobile device screen, an embodiment which allows the user to hold the device may cause the device to be angled relative to the camera. Angling the screen relative to the external camera will alter the external camera's perception of movement of the user's hand. Accordingly, the distance traveled by the user's hand would need to be scaled proportionately with the angle of the mobile device to convert the detected movement of the user's hand to movement of the user's hand shown in the composited video.

In one embodiment, an image, such as a photograph or CAD drawing of the device, is used to represent a pristine view of the physical features of the external surface of the device. The video output of the display's screen is then inserted into the respective region of the photograph normally encompassing the screen to enable the video of the device to appear within the portion of the picture encompassed by the screen. The view of the external camera is then composited with the video and optionally superimposed on the picture of the device, to show the user's hand relative to the touch sensitive screen.

To prevent the external camera from capturing information being shown on the device display, in one implementation physical filtering (privacy screen or polarizing filter) is used to remove information that is being shown on the display. In another implementation, digital processing is used to detect the location of the device and to digitally remove the display from the image stream captured by the external camera.

According to an embodiment, the external camera's view of the device's screen is optically masked to prevent content on the device's screen from being captured by the camera. In one embodiment, a linear or circularly polarizing filter is mounted on in front of the camera's lens and oriented differently than the polarization of light being emitted from the touch sensitive screen. This cross-polarization effectively blocks the camera's view of the device's LCD screen. This method works well with devices that use LCDs that emit highly polarized light. Examples of commercially available devices that use LCDs that emit highly polarized light include the iPad2 and iPad3 devices available from Apple, Inc. When a cross-polarized lens is placed on the camera, the external camera sees the user's hand, but the screen itself is dark.

Not all devices that have a touch sensitive screen emit polarized light. For example, light emanating from the LCD screen on other mobile devices (e.g., the screens on an iPhone4 or iPhone5) cannot be blocked using a simple linear or circular polarizing filter on the camera, since these devices do not emit highly polarized light.

In this situation, there are several ways to physically remove images being displayed on the device from being captured by the camera. In a first embodiment, a privacy screen protector is used. For example, 3M produces a privacy screen protector for touch devices like the iPad. A privacy screen protector of this nature has microlouvers which enable the screen to be viewed from the front but which block the screen when viewed from an angle.

In this embodiment, the privacy screen protector is placed directly on top of the device's display. The privacy screen protector is thin, so it does not interfere with the mobile device's touch sensitive interface. If the privacy screen protector's microlouvers are at a sufficiently sharp angle off vertical, then an external camera placed directly above the screen cannot view the screen's surface content (seeing instead the microlouvers' opaque edges). The camera would, however, still see the user's hand. Use of angled microlouvers may require the user to likewise view the screen from an angle.

If the microlouvers are oriented to be perpendicular to the screen, then the user will be able to view the screen from directly in front. However, to prevent the external camera from capturing the screen, the external camera would need to be mounted to the side of the device (see e.g. FIG. 5), to view the screen from an angle sufficiently sharp to avoid seeing the screen's content. It is currently envisioned that the camera would view the screen from an angle of approximately between 30 and 60 degrees from vertical, although the particular implementation will depend on the angle at which the lovers are oriented within the privacy screen protector.

When the camera views the screen from an angle, as shown in FIG. 5, the keystone effect introduced by the camera's off-angle view can be un-warped in real time in software, to make the external camera's view appear to be coming from directly above the device.

In another embodiment, a polarizing film may be used instead of the privacy film to more strongly polarize light emanating from the display. Since light emanating from the display may be somewhat polarized, the polarizing film should be oriented on the display to avoid distorting colors of the display. In this embodiment, a complementary (90 degree rotated) polarizing filter is then placed on the camera to prevent the content of the display of the mobile device from being captured by the camera. By using a thin polarizing film, such as a polarizing screen protector, and a cross-polarized filter on the external camera, it is possible to prevent light emitted from the screen from being sensed by the camera. One advantage polarizing films have over privacy films is that they tend to be clearer which can make it easier for the person interacting with the device to see the screen. Likewise, unlike a privacy screen, a person can view the touch sensitive screen from any angle when a polarizing filter is used, which may make it easier for the person using the device to interact with the device.

Where a polarizing film is used with a camera that is mounted to the device, rotation of the device to cause the display to move from portrait to landscape will not affect the relative orientation of the polarization of the screen relative to the camera and, hence, movement of this nature will not affect the light attenuation afforded through the use of cross-polarized filters on the camera and device. However, where the camera is not fixed relative to the device, i.e. where the camera mounted on the user's person or is suspended above a desktop as shown in FIGS. 6 and 7, rotation of the device from portrait to landscape can cause a relative polarization shift between the device and the camera to eliminate the cross-polarization dampening of the output video from the device. Hence, where physical filtering of the video is being used to minimize detection of the content of the device by the external camera, it may be preferable to mount the camera to the device or to a structure supporting the device (see e.g. FIGS. 8-9) to maintain the relative polarization between the camera and the device.

Rotation of the device may cause the orientation of the content of the display to change from portrait to landscape. In an implementation, this re-orientation is captured at the device and used to adjust the resolution of the output video stream to ensure the output video stream displays the content captured from the device correctly.

Although the use of a polarizing filter and privacy filter have been described to physically prevent the camera from seeing the content of the device, in another embodiment, software is used to extract only the hand from the external camera's view. This obviates the need for a polarizing filter or privacy screen. In this case, well known image processing algorithms implemented in software would compare the two incoming video streams, identify which pixels appear to be from the user's hand and mix those pixels with the photo and screen video stream. Many ways of implementing this type of video processing exist, including background detection, image recognition, edge detection, color detection, region growing, etc. Region growing, for example, involves image segmentation in which initial starting pixels or "seed points" are selected and then neighboring pixels are evaluated to determine whether the pixel neighbors should be added to the region associated with the seed point. This process iterates to select pixels that should be included within the region and, as noted above, may be used to distinguish pixels associated with the user's hand from other pixels in the image provided by the external camera. Other ways of identifying the user's hand and isolating the user's hand while interacting with the device may likewise be used.

The video stream from the device and the video stream from the external camera 32 are fed into a compositing computer 12, which mixes a photograph of the device and the two streams into a single composited real-time video output stream 14.

The photograph of the device shows the physical features of the device, such as the edge of the device, case, buttons, camera, microphone slit, home button, etc. The live feed of the device's screen is then inserted into the region of the photograph of the device occupied by the device's display. This effect creates an output stream built with a pristine representation of the device's physical case as well as the actual video being shown on the screen of the device that is being operated by the user.

Super-imposed on this view is a (possibly translucent) overlay of the person's hand interacting with the device from the external camera so that the audience can see what the presenter does to interact with the device during the demonstration. In an embodiment where the external camera's view is fixed relative to the device, in one embodiment the compositing software is used to geometrically fix the position of the case's photograph to correspond to its location in the external camera's (possibly keystone corrected) view of the case. In this embodiment, the compositing software can take advantage of this fixed geometry to give the photograph priority in the output video stream. Only when the hand-extraction software is quite certain that a hand is visible would that photograph be "overwritten" with the external camera's view. Optionally, the hand extraction software can be built to be quite robust, e.g. by including one or more rules specifying that the software should look for regions having flesh-colored pixels (as opposed to the color of the device's case). Other implementations may be developed as well.

As discussed below, optionally the overlay of the person's hand may be imposed only when the user's hand is detected above the surface of the device. This enables the software to avoid mixing the video streams from the camera into the view of the picture and device output when the user is not interacting with the device. This reduces the amount of processing required to create the output video stream when the user is not interacting with the device. Likewise the user may selectively disable the camera view in those situations where the view of the user's hand is not desired.

To enable the video from the device to be inserted into the picture frame, it is necessary to capture the video being shown on the device. The manner in which this is done will depend on the implementation. For example, devices from Apple which contain a Lightning adapter use hardware to encode the screen's graphics as well as device audio. This enables the content of the device's display to be provided at the Lightning port in the form of an encoded video stream. Several screencasting applications for capturing and transmitting live video and/or screen shots are commercially available from companies including Glance Networks, RealVNC, LogMeIn, and GoToAssist. Similarly, many devices support wireless mirroring of a device's display, although this requires sufficient bandwidth to exist to support streaming video. In an environment such as a call center, having numerous call center agents simultaneously streaming video over a wireless network may be problematic.

In addition to capturing a video of the device's screen, it is necessary to enable the video of the device' screen to be input to the compositing computer 12 so that the video can be composited with the video of the user's hand from the external camera.

In one implementation, a cable is used to directly transmit the video available at the device' output port, e.g. the video of the device's screen available at its Lightning port, to an input port on the compositing computer. For example, a Lightning to USB cable may be used to transmit encoded video stream of the device available at the Lightning connector to the compositing computer. A driver in the compositing computer would then decode the encoded video stream to a video stream recognized and able to be manipulated by the operating system and/or compositing software implemented on the compositing computer. OS X Yosemite provides the capability of receiving a video stream of this nature at a compositing computer, which simplifies the process of receiving the video of the device's screen at the compositing computer.

Unfortunately, depending on the device and the format of the video available at the output port on the device, a driver may not exist to convert the video available at the output port to a format that is usable by the compositing computer. In this instance, further conversion may be required to convert the format of the video available at the output port of the device into a format that is recognized by the compositing computer.

For example, an HDMI adapter may be used to convert the video stream at the output port of the device into HDMI encoded video. For example, where the device has a Lightning port, a Lightning-to-HDMI adapter containing an ARM chip and other electronics may be used to convert the encoded screen video to HDMI format. When the adapter is plugged in, the operating system (e.g. iOS 7) on the device queries the adapter to determine what the adapter wants to do. In this example, the adapter is looking to mirror the device's screen to an HDMI-connected display. The operating system will first ensure the adapter is running the latest version of firmware and then encode its screen and send the encoded video (and audio) to the adapter. The adapter receives the encoded video and decodes the video and audio back into raw pixel/sample format and multiplexes it onto the adapter's HDMI interface.

Although most computers are capable of outputting HDMI video, very few computers are able to receive input HDMI video. To do this requires an HDMI capture device to receive the HDMI video and convert the HDMI video into H.262 or H.264 and then output the re-encoded video using a standard protocol such as MPEG-2 or MPEG-4. The output from the HDMI capture device (in MPEG format) is recognizable by most computers and may be received by the compositing computer at a USB port or Firewire interface. A standard video driver at the compositing computer takes the incoming video stream, decodes it back to the pixel domain, where the compositing software combines the video from the device with the video of the user's hand from the external camera and encodes the composited video into an MPEG, M-JPEG or other video format for transmission to the viewer.

In this embodiment, the device screen is encoded first by the device hardware, then converted to HDMI video by the Lightning/HDMI adapter, re-converted from HDMI to H.262/264 by the HDMI capture device, decoded into the pixel domain and then re-encoded into Motion JPEG (M-JPEG) or some other format such as MPEG or a Quicktime Video stream by the compositing software.

Although each of these conversions may involve some loss of fidelity of the original data, capturing data from the device is possible using commercially available components. For example, for a device having a Lightning connector, a Lightning-to-HDMI adapter is commercially available from Apple. HDMI capture devices are also commercially available. One such HDMI capture device is the ADC HD50 offered for sale by Grass Valley.

Another option to importing video is to directly convert HTMI into pixel data and import the pixel data over a USB interface. One such device, which is capable of receiving HDMI formatted input stream and outputting raw HD pixels over a fast USB 3.0 interface, is available from AverMedia as the ExtremeCap U3. Depending on the operating system, a custom driver may need to be built to receive the pixel data from this HDMI-to-pixel converter, but use of a HDMI-to-pixel converter has the advantage of not requiring transcoding of HDMI into H.262/264 and then decoding back into the pixel domain, with its inherent addition of latency and potential loss of visual fidelity.

In an implementation where both the video stream 24 and camera stream 30 are directly captured by the compositing computer, the two video streams may be assumed to be sufficiently synchronized such that timing of the two video streams is not required to be adjusted. In an implementation where significant processing is required to obtain the video 24 from the device 26, however, it may be necessary to synchronize the video stream 30 from the camera 32 with the video 24 from the device 26. For example, if there is a delay on the order of one to two seconds associated with converting the video stream to HDMI and back, it may be necessary to inject an associated delay into the video stream from the external camera. There may be several ways to synchronize the video streams. In one embodiment, the user is able to adjust the delay through interaction with the compositing computer or device to manually specify an amount of delay to be inserted into the video stream of the external camera to cause the video of the hand to be synchronized with the video of the device screen. In another embodiment, events may be detected in the video of the device screen, such as touch events, and the video from the external camera may be analyzed to determine when the user touched the device screen in the detected location. This comparison may then be used to synchronize the two video streams.

The composited video output is created in the following way. The deepest layer of the composite is a high-quality straight-on long-focus photograph of the device's case, altered if needed to have virtually no keystone effect, making the device's display location perfectly rectangular. Live video from the device's screen is spatially scaled with 2-D anti-aliasing filters to fit precisely within the display location in the photograph and layered on top of the photograph.

Meanwhile, video from the external camera is thresholded (and possibly region-grown) to replace portions of the video corresponding with the device and device screen with "transparent" pixels. For example, the video from the external camera may show some of the background and the user's hand, possibly in a partially translucent manner. If needed, the external camera's video is also spatially warped to undo keystone effects introduced by the external camera's short-throw view of the scene (or possibly angled view, depending on the implementation). The modified external camera video is then composited as the top-most layer over both the photograph of the device and the inserted video from the device's display.

The end result is a pristine "background" view of the device's case and screen contents, overlaid in the foreground with only the user's hand. People viewing the output video will see the user's hand interacting with the device's screen as well as with physical buttons that lie beyond the screen, like pushes to the "Home", "volume" or "power" buttons. Meanwhile, the device's screen contents will be rendered in the highest quality possible, free from glare, noise, color changes, Moire patterns, coma distortion, sub-optimal exposure setting or focus, etc. which may be introduced where a camera captures images shown on a device screen.

In one embodiment, the opacity of the hand in the processed external camera video is set to less than 100%, so viewers "see through" the user's hand gestures. That way, viewers more easily see how a virtual button on the display changes its appearance as the user depresses the button, even if the user's finger blocks a clear view of the button. Since the hand is semi-transparent, the hand does not obscure/obstruct the audience's view of the device's display. Showing the hand in a continuous manner also lets the user gesture naturally, such as pointing to an object on the display to call attention to it, but without touching it.

Although an embodiment has been described in which the user's hand is shown in the overlay view, the invention is not limited in this regard as less than the entire hand may also be shown. For example, a single finger or a pair of fingers in the form of a two touch gesture may be shown moving about the display, or other multi-finger, multi-touch gestures.

Likewise, although an embodiment was described in which the overlay of the user's hand is continuously shown, in another embodiment the overlay is only inserted into the video stream when a touch event or gesture is detected indicating an interaction between the user and the touch sensitive device has occurred. In this embodiment, the external camera continuously captures video of the device, but the output of the external camera showing the user's hand is only inserted into the video stream for the audience when the user actually interacts with the content being shown on the mobile device.

In another embodiment, the mobile device's orientation (landscape or portrait) is sensed by the device and communicated to the computer, which adjusts the transmitted resolution or aspect ratio of the video to accommodate the orientation of the device. Software synthesizing the output video stream should include several intermediate frames illustrating the device being physically rotated in that same direction (clockwise or counter-clockwise), so the viewer intuitively understands the view changed between portrait and landscape because the device was physically rotated.

Figure 10:
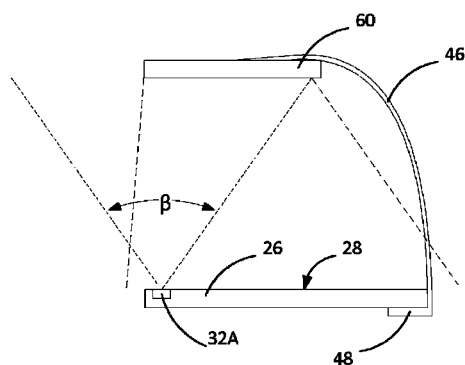
FIG. 10 shows an embodiment in which a front-facing camera of the device is used to capture interaction between a user and the device.

Although in the preceding description the external camera was described as being physically separate from the device, in another implementation the external camera is implemented using a front facing camera on the mobile device itself. In this embodiment, rather than using a camera suspended above the device as shown in FIGS. 4 and 5, a mirror 60 is suspended above the device and a camera 32A focuses on the mirror. In this embodiment, the mirror should be suspended approximately 4-6 inches above the surface of the device to enable the camera to focus on the reflection of the user's hand in the mirror. Since the camera is typically outside of the touch sensitive area of the device, the user's hand is not likely to block the camera view significantly. For example, as shown in FIG. 10, the angle of view of the camera β includes mirror 40, which shows a reflection of the device 26. In this way the camera view is able to capture a person's hand as the person interacts with the surface of the device 26.

In this embodiment, a polarizing filter is placed on the device screen (if the screen is not strongly polarized) and a cross-polarized filter is placed over the front facing camera aperture. The reflection of the device in the mirror will maintain the polarization of the light emanating from the device so that the cross-polarization will prevent the camera from seeing significant light emanating from the display. An advantage of using this implementation is that a separate camera is not required. However, the camera's self-view of itself may be expected to exhibit significant keystoneing which potentially may be compensated somewhat by adjusting the placement and orientation of the mirror. Additionally, depending on the particular device, the device's operating system may be designed to not allow the front camera to be continuously enabled in all modes of operation, which may hamper using the front camera to monitor the user's interaction with the device. Further, particular devices may not natively output both the camera's signal and a screen signal, so utilization of this implementation may require a software application to be downloaded and installed on the device prior to using the front facing camera in connection with capturing the user's interaction with the device.

In another embodiment, a software application containing an animated hand is provided. When the user touches the screen the location information associated with the touch is provided to the software application to cause the animated hand to appear with a finger touching the display at the location associated with the touch. In this implementation, rather than using an externally captured live view of the user's hand, a computer generated hand is superimposed on the output of the device and animated to cause the fingers of the animated hand to touch the device wherever the user has touched the device. In this manner a realistic looking animated representation of a human hand may be used to show a viewer how the person demonstrating the device is touching the screen to interact with the applications running on the device. However, since the device will not have advance notice of where the user is going to touch the device, use of a computer animated hand may lack some of the realism of an externally captured view of the user's hand since the computer generated hand is likely to be limited to showing a touch after the touch has occurred rather than showing the hand movement toward a touch point as the person's hand is moved over the surface of the device.

Figure 11:
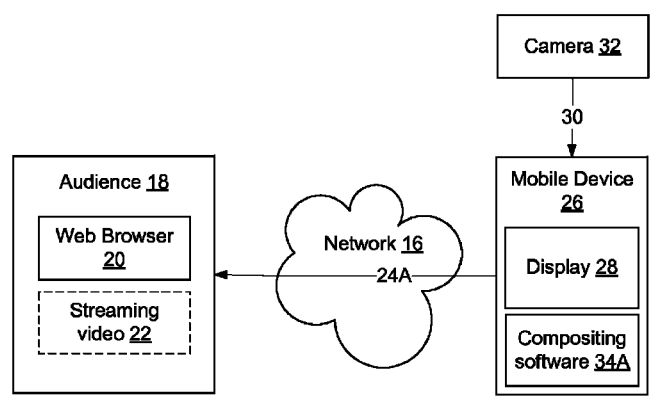
FIG. 11 is a functional block diagram of another example system for providing a composited video stream.

In the preceding description, an assumption was made that an external computer was required to implement the compositing functions. In another embodiment, as shown in FIG. 11, a compositing application 34A running on the device 26 is provided to receive input 30 from an external camera and combine the video of the user's hand detected by the external camera with with video of the device's screen. In this implementation, the output of the compositing application may be made available as signal 24A on an output port of the device to be transmitted on network 16 to a viewer 18 without requiring the use of a separate compositing computer. Likewise in the embodiment shown in FIG. 10, compositing application 34A on device 26 may be utilized to combine the front-facing camera's view of the user's hand with the video of the device's screen and output signal 24A.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for demonstrating interaction with a device having a touch sensitive screen, the computer program comprising a set of instructions which, when executed by a computer, cause the computer to perform a method comprising the steps of:

obtaining a screen capture video stream from the device having the touch sensitive screen, the screen capture video stream showing content being shown on the touch sensitive screen;

obtaining an optically filtered external camera video stream from a camera positioned to view the touch sensitive screen and capture a user's fingers or hand as the user's fingers or hand interacts with the touch sensitive screen, the optically filtered external camera video stream having content being shown on the touch sensitive screen optically removed to not be captured by the camera; and overlaying the optically filtered external camera video stream on top of the screen capture video stream to create a combined video stream in which the screen capture video stream is used to show the content being shown on the touch sensitive screen and the optically filtered external camera video stream is used to show interaction by the user's fingers or hand with the touch sensitive screen.

2. The non-transitory tangible computer readable storage medium of claim 1, wherein the device is a mobile device, and wherein the touch sensitive screen forms a display of the mobile device.

3. The non-transitory tangible computer readable storage medium of claim 1, wherein content being shown on the touch sensitive screen is optically removed to not be captured by the camera using cross-polarization.

4. The non-transitory tangible computer readable storage medium of claim 3, wherein the touch sensitive screen is polarized in a first direction and wherein a cross-polarized filter is interposed between the touch sensitive screen and a lens of the camera.

5. The non-transitory tangible computer readable storage medium of claim 4, wherein a touch sensitive screen that emits non-strongly polarized light is strongly-polarized by application of a polarizing screen protector to the touch sensitive screen.

6. The non-transitory tangible computer readable storage medium of claim 1, wherein content being shown on the touch sensitive screen is optically removed to not be captured by the camera using a privacy screen protector.

7. The non-transitory tangible computer readable storage medium of claim 6, wherein the privacy screen protector has microlouvers positioned approximately vertical relative to the touch sensitive screen, and wherein the camera is positioned to view the touch sensitive screen at an angle.

8. The non-transitory tangible computer readable storage medium of claim 6, wherein the privacy screen protector has microlouvers oriented obliquely relative to the touch sensitive screen, and wherein the camera is positioned to view the touch sensitive screen approximately from a perpendicular position.

9. The non-transitory tangible computer readable storage medium of claim 1, wherein the camera providing the optically filtered external camera video stream is a front facing camera housed within the device having the touch sensitive screen.

10. The non-transitory tangible computer readable storage medium of claim 9, wherein the camera providing the optically filtered external camera video stream is mounted on an arm fixed to the device having the touch sensitive screen to positionally fix the camera relative to the device.

11. The non-transitory tangible computer readable storage medium of claim 9, further comprising a first polarizing filter affixed in front of the front facing camera.

12. The non-transitory tangible computer readable storage medium of claim 1, wherein a touch sensitive screen that emits non-strongly polarized light is strongly-polarized by application of a polarizing screen protector to the touch sensitive screen.

13. The non-transitory tangible computer readable storage medium of claim 1, further comprising the step of obtaining a still image of a portion of the device surrounding the touch sensitive screen, the still image of the portion of the device being a separate image not obtained from the optically filtered external camera video stream and not from the screen capture video stream, and inserting the screen capture video stream into a region of the still image of the portion of the device corresponding with a location of the touch sensitive screen on the device.

14. The non-transitory tangible computer readable storage medium of claim 13, wherein the optically filtered external camera video stream overlays the still image of the device.

15. The non-transitory tangible computer readable storage medium of claim 1, wherein the step of overlaying the optically filtered external camera video stream on top of the screen capture video stream causes the camera view of the user's fingers or hand to be partially translucent relative to the screen capture video stream.

16. The non-transitory tangible computer readable storage medium of claim 1, wherein the step of overlaying the optically filtered external camera video stream on top of the screen capture video stream occurs only when the camera detects the user's fingers or hand in front of the touch sensitive screen.

17. The non-transitory tangible computer readable storage medium of claim 1, wherein the step of overlaying the optically filtered external camera video stream on top of the screen capture video stream is performed by a compositing computer.

18. The non-transitory tangible computer readable storage medium of claim 1, wherein the step of overlaying the optically filtered external camera video stream on top of the screen capture video stream is performed by the device having the touch sensitive screen.

* * * * *